Sept. 13, 1949.    W. F. KESTER    2,481,931
REPLACEABLE BEARING JOURNAL ASSEMBLY
Filed Feb. 6, 1947

Inventor
William Frank Kester

By Clarence A. O'Brien
and Harvey B. Jacobson
Attorneys

Patented Sept. 13, 1949

2,481,931

UNITED STATES PATENT OFFICE 2,481,931

REPLACEABLE BEARING JOURNAL ASSEMBLY

William Frank Kester, Hamilton Field, Calif.

Application February 6, 1947, Serial No. 726,838

4 Claims. (Cl. 308—237)

The present invention relates to new and useful improvements in bearing journals and more particularly to a bearing journal assembly which can be readily replaced when excessive wear has taken place.

An important object of the present invention is to provide a replaceable bearing journal assembly adapted for use upon crank shafts and various other types of shafts equipped with a bearing journal and embodying novel means for securing bearing journals to the shaft as well as for securing the sections of the bearing journal to each other.

More specifically, the invention embodies the provision of a bearing journal composed of semi-cylindrical bearing journal sections, together with thermally expanded locking pins for securing the sections of the bearing journal in assembled relation on a shaft.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
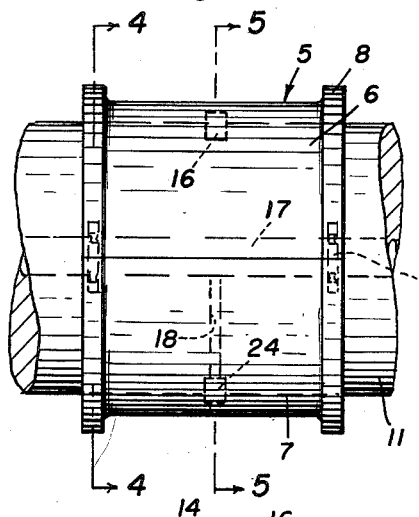
Figure 1 is a side elevational view showing the bearing journal assembled on a shaft.
Figure 2:
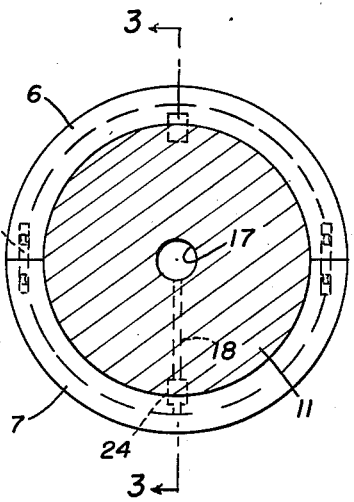
Figure 2 is an end elevational view.
Figure 3:
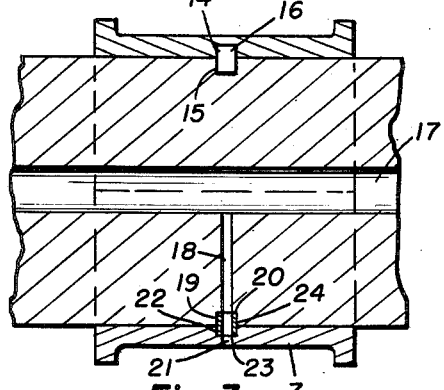
Figure 3 is a longitudinal sectional view taken on a line 3—3 of Figure 2.
Figure 4:
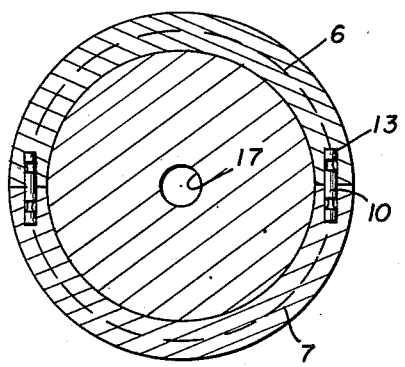
Figure 5:
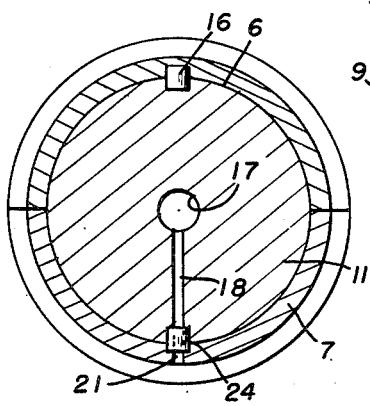
Figure 6:
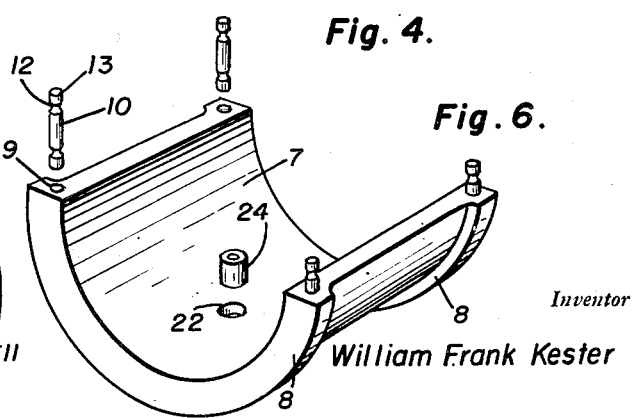

Figures 4 and 5 are transverse sectional views taken respectively on the lines 4—4 and 5—5 of Figure 1; and, Figure 6 is a perspective view of one of the bearing journal sections.

Referring now to the drawing in detail wherein for the purpose of illustration I have disclosed a preferred embodiment of the invention the numeral 5 designates the journal assembly generally which is composed of a pair of semi-cylindrical bearing journal sections 6 and 7 formed with flanges 8 at the ends thereof.

The meeting edges of the sections adjacent the ends thereof are formed with openings 9 in which locking pins 10 are received for guiding the sections into properly aligned assembled relation on a shaft 11 and also for locking the sections to each other.

The locking pins 10 are formed with annular grooves 12 adjacent each end to provide end or head portions 13 at the ends of the pins.

In assembling the sections 6 and 7 of the bearing journal the pins 10 are cooled to lower the temperature thereof sufficiently to cause shrinkage or contraction of the pin, the openings 9 being of proper diameter to snugly or tightly receive the ends of the contracted pin which will then expand in the opening 9 under normal temperature to cause a tight fitting or locking engagement of the pins in the sections of the bearing journal.

The inner surface of the section 6 is formed with a recess 14 and the shaft 11 is likewise formed with a recess 15 adapted to receive the opposite ends of a locking pin 16 to secure the sections 6 against rotation on the shaft 11. The locking pin 16 is likewise contracted before assembly in the same manner as heretofore described with respect to the pin 10 to thus permit expansion of the pins under normal temperature to lock the section 6 to the shaft.

The shaft 11 is formed with a longitudinally extending lubricating passage 17 communicating with a lateral passage 18 which is counterbored at its outer end as shown at 19 to provide a shoulder 20 therein. The section 7 is also formed with a lubricating passage 21 counterbored at the inner periphery of the section as shown at 22 to provide a shoulder 23 therein.

A tubular locking pin 24 has its ends received in the counterbores 19 and 22 to lock the section 7 to the shaft against rotation, the locking pin 24 being first contracted as heretofore explained with respect to the pins 10 and 16. The locking pin 24 provides a connecting passage of the lateral passage 18 of the shaft of the lateral passage 21 in the section 7 to thus lubricate the outer surface of the bearing journal.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What I claim is:

1. A replaceable bearing journal assembly comprising a pair of semi-cylindrical bearing journal sections having openings in their meeting edges, and locking pins having thermally expansible heads positioned in said openings to secure the sections in assembled relation on a shaft.

2. A replaceable bearing journal assembly comprising a pair of semi-cylindrical bearing journal sections having openings in their meeting edges, and locking pins having annular grooves adjacent their ends to provide heads at the ends of the pins, said heads being received in said openings and responsive to temperature changes to expand after being cooled to lock the heads in said openings.

3. In combination a shaft having lateral recesses, a sectional bearing journal assembly positioned on the shaft and also having internal recesses aligned with the recesses of the shaft, said sections also having aligned openings in their meeting edges, and thermally expansible locking pins positioned in the aligned recesses and in the aligned openings and operable to lock the sections to each other and to lock the sections in assembled relation on the shaft.

4. In combination a shaft having lateral recesses, a sectional bearing journal assembly positioned on the shaft and also having internal recesses aligned with the recesses on the shaft, one of said aligned recesses in the shaft and assembly being counterbored, lubricating passages in the shaft and in the bearing journal assembly communicating with the respective counterbored recesses, thermally expansible locking pins positioned in said aligned recesses to lock the sections of the assembly to the shaft, and including a hollow locking pin in the counterbored recesses to provide a lubricating passage connecting the passages of the shaft and assembly, said sections having aligned recesses in their meeting edges, and thermally expansible locking pins positioned in said last named recess to lock the sections to each other.

WILLIAM FRANK KESTER.

REFERENCES CITED

The following references are of record in the file of this patent:

UNITED STATES PATENTS

| Number | Name | Date |
|---|---|---|
| 1,539,413 | Fish | May 26, 1925 |
| 1,692,966 | Treiber | Nov. 27, 1928 |
| 2,267,859 | Fedden | Dec. 30, 1941 |

FOREIGN PATENTS

| Number | Country | Date |
|---|---|---|
| 671,613 | Germany | Feb. 10, 1939 |